United States Patent

Nakano

[11] Patent Number: 5,533,191
[45] Date of Patent: Jul. 2, 1996

[54] COMPUTER SYSTEM COMPRISING A PLURALITY OF TERMINAL COMPUTERS CAPABLE OF BACKING UP ONE ANOTHER ON OCCURRENCE OF A FAULT

[75] Inventor: Tadayoshi Nakano, Tokyo, Japan

[73] Assignee: NEC Corporation, Tokyo, Japan

[21] Appl. No.: 433,827

[22] Filed: May 4, 1995

Related U.S. Application Data

[63] Continuation of Ser. No. 54,060, Apr. 29, 1993, abandoned.

[30] Foreign Application Priority Data

May 7, 1992 [JP] Japan .................................. 4-114911

[51] Int. Cl.$^6$ .................................................. G06F 11/00
[52] U.S. Cl. ............................................... 395/182.09
[58] Field of Search ........................... 371/7, 11.1, 11.3; 395/575, 182.09, 182.08, 182.02

[56] References Cited

U.S. PATENT DOCUMENTS

| | | | |
|---|---|---|---|
| 3,229,260 | 6/1966 | Falkoff | 364/200 |
| 4,412,281 | 10/1983 | Works | 364/200 |
| 4,817,091 | 3/1989 | Katzman et al. | 371/9 |
| 4,819,232 | 4/1989 | Krings | 371/9 |
| 4,847,837 | 7/1989 | Morales et al. | 371/8 |
| 4,852,092 | 7/1989 | Makita | 371/12 |
| 4,870,704 | 9/1989 | Matelan et al. | 364/200 |
| 4,939,752 | 7/1990 | Literati et al. | 375/107 |
| 5,214,652 | 5/1993 | Sutton | 371/9.1 |
| 5,247,664 | 9/1993 | Thompson et al. | 395/600 |
| 5,271,013 | 12/1993 | Gleeson | 371/9.1 |
| 5,307,481 | 4/1994 | Shimazaki et al. | 395/575 |
| 5,379,418 | 1/1995 | Shimazaki et al. | 395/575 |
| 5,408,649 | 4/1995 | Beshears et al. | 395/575 |

*Primary Examiner*—Robert W. Beausoliel, Jr.
*Assistant Examiner*—Norman M. Wright
*Attorney, Agent, or Firm*—Foley & Lardner

[57] ABSTRACT

In a computer system comprising a host computer and a plurality of terminal computers connected to the host computer, the host computer comprises a monitoring section for monitoring the terminal computers to judge whether or not a fault occurs in each of the terminal computers. The monitoring section produces a fault signal when the fault occurs in a faulty one of the terminal computers. A command producing section is responsive to the fault signal and produces a command signal to supply the command signal to a specific one of the terminal computers that is different from the faulty one of the terminal computers. Each of the terminal computers comprises a processing section responsive to the command signal for putting into operation to process a job which is carried out at the faulty one of the terminal computers.

6 Claims, 3 Drawing Sheets

| JN | | |
|---|---|---|
| DB | DATA BASE DEVICE NAME | DATA BASE FILE NAME |
|  | ⋮ | ⋮ |
| JA | JOURNAL DEVICE NAME | JOURNAL FILE NAME |
|  | ⋮ | ⋮ |
| OL | LOG DEVICE NAME | LOG FILE NAME |
|  | ⋮ | ⋮ |

FIG. 2

| AJN | TSN | STN |
|---|---|---|
| G1 | NAME OF 1ST TERMINAL COMPUTER | NAME OF 2ND TERMINAL COMPUTER |
| G2 | NAME OF 2ND TERMINAL COMPUTER | NAME OF 1ST TERMINAL COMPUTER |

FIG. 3

COMPUTER SYSTEM COMPRISING A PLURALITY OF TERMINAL COMPUTERS CAPABLE OF BACKING UP ONE ANOTHER ON OCCURRENCE OF A FAULT

This application is a continuation of application Ser. No. 08/054,060, filed Apr. 29, 1993 now abandoned.

BACKGROUND OF THE INVENTION

This invention relates to a computer system comprising a host computer and a plurality of terminal computers connected to the host computer.

Heretofore, it is known that a computer system comprises a host computer connected to first through N-th terminal computers, where N represents a positive integer which is not less than one. The first through the N-th terminal computers may carry out first through N-th jobs under control of the host computer.

When a fault occurs in one of the first through the N-th terminal computers that will be called a fault terminal computer hereunder, it is necessary to restart the job which is carried at the fault terminal computer. Accordingly, the computer system comprises at least one another terminal computer in order to continue to process the job which is carried out at the fault terminal computer.

As described above, the computer system comprises at least another terminal computer as a back-up computer in addition to the first through the N-th terminal. computers.

SUMMARY OF THE INVENTION

It is an object of this invention to provide a computer system capable of backing a job of a fault terminal computer up without a back-up computer.

Other objects of this invention will become clear as the description proceeds.

According to this invention, there is provided a computer system comprising a host computer and first through N-th terminal computers connected to the host computer, where N represents a positive integer which is not less than one. The first through the N-th terminal computers carry Out first through N-th jobs different from one another. The host computer comprises monitoring means for monitoring the first through the N-th terminal computers to judge whether or not a fault occurs in each of the first through the N-th terminal computers. The monitoring means produces a fault signal when the fault occurs in a faulty one of the first through the N-th terminal computers. The host computer further comprises command producing means responsive to the fault signal for producing a command signal to supply the command signal to a specific one of the first through the N-th terminal computers that is different from the faulty one of the first through the N-th terminal computers. Each of the first through the N-th terminal computers comprises processing means responsive to the command signal for putting into operation to process a job which is carried out at the faulty one of the first through the N-th terminal computers.

BRIEF DESCRIPTION OF THE DRAWINGS

FIG. 2 is a format of a hardware resource data used in the computer system illustrated in FIG. 1;

FIG. 3 is a format of an allotment information used in the computer system illustrated in FIG. 1.

DESCRIPTION OF THE PREFERRED EMBODIMENT

Figure 1:
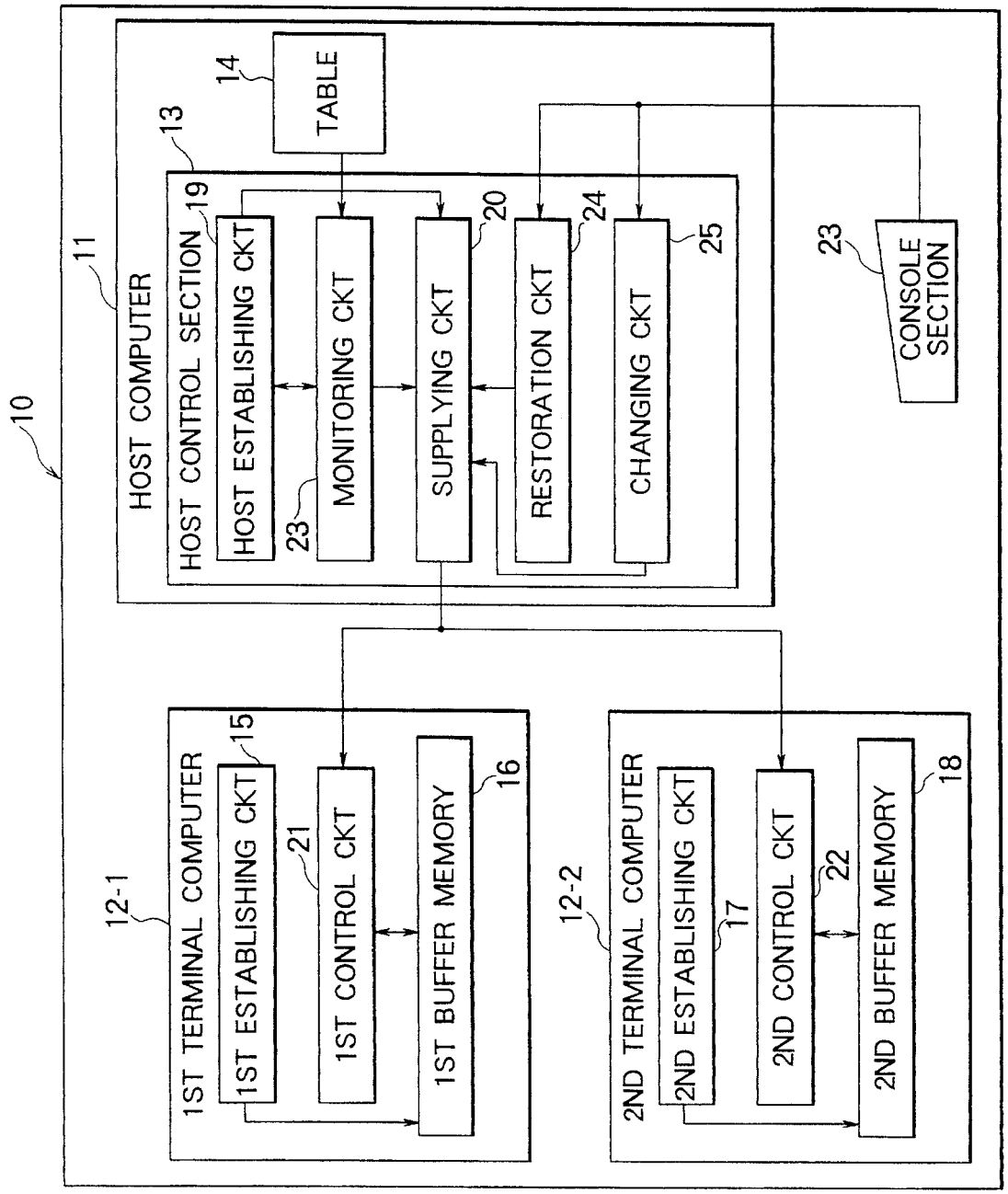
FIG. 1 is a block diagram of a computer system according to a preferred embodiment of this invention.

Referring to FIG. 1, a computer system 10 according to a preferred embodiment of the present invention comprises a host computer 11 and first through N-th terminal computers 12-1 to 12-N connected to the host computer 11, where N represents a positive integer which is not less than one. In the illustrated example, the positive number N is equal to two. The first and the second terminal computers 12-1 and 12-2 may carry out first and second jobs different from each other.

The host computer 11 comprises a host control section 13 for controlling the first and the second terminal computers 12-1 and 12-2 as will later be described. The hosts computer 11 further comprises a job state table 14 for storing states of the first and the second terminal computers 12-1 and 12-2 as first and second terminal computer states, respectively.

Attention will be directed to the first terminal computer 12-1. On carrying out the first job in the first terminal computer 12-1, a first establishing circuit 15 sends a hardware resource data and a software environment data to a first buffer memory 16. The hardware resource data and the software environment data are memorized in the first buffer memory 16. The hardware resource data is for defining hardware resources carrying out the first and the second jobs. The software environment data is parameters which define environment of the first and the second terminal computers 12-1 and 12-2.

Referring to FIG. 2, the hardware resource data has a resource data format illustrated in FIG. 2. The resource data format comprises a job name area labelled JN, a data base area labelled DB, a journal area labelled JA, and an operation log area labelled OL. The job name area JN is for storing a job name. The data base area DB is for storing a data base device name and a data base file name each of which identifies a data base device and a data base file for storing a data base. The journal area JA is for storing a journal device name and a journal file name each of which identifies a journal device and a journal file for storing a journal data. The operation log area is for storing a log device name and a log file name each of which identifies a log device and a log file for storing a log data.

Turning to FIG. 1, a second establishing circuit 17 sends the hardware resource data and the software environment data to a second buffer memory 18 on carrying out the second job in the second terminal computer 12-2.

On putting the control section 13 into operation, a host establishing circuit 19 sends an allotment information to a supplying circuit 20.

Referring to FIG. 3, the allotment information has an allotment information format illustrated in FIG. 3. The allotment information format comprises an allotment job name area labelled AJN, an operating on-line transaction system name area labelled TSN, and a substitute on-line transaction system name area labelled STN. The allotment job name area AJN is for storing names of the first and the second jobs. The name of the first job will be called a first job name G1. The name of the second job will be called a second job name G2. The operating on-line transaction system name area TSN is for storing names of operating on-line transaction systems which carry out the first and the second jobs. In the illustrated example, the operating on-line transaction system name area TSN carries the name of the first terminal computer 12-1 in correspondence to the first job name G1. Furthermore, the operating on-line transaction system name area TSN carries the name of the second terminal computer 12-2 in correspondence to the second job name G2. The substitute on-line transaction system name area STN is for storing the names of substitute on-line transaction systems which substitute for carrying out the first and the second jobs. In the illustrated example, the substitute on-line transaction system name area TSN carries the name of the second terminal computer 12-2 in correspondence to the first job name G1. Furthermore, the substitute on-line transaction system name area TSN carries the name of the first terminal computer 12-1 in correspondence to the second job name G2.

Again turning to FIG. 1, the supplying circuit 20 supplies to the allotment information to the first and the second terminal computers 12-1 and 12-2. In the first terminal computer 12-1, the allotment information is received at a first control circuit 21 to be memorized in the first buffer memory 16. Similarly, the allotment information is received at a second control circuit 22 to be memorized in the second buffer memory 18 in the second terminal computer 12-2.

The first and the second terminal computer states are established to the job state table 14 by an operating system (OS) of the host computer 11. In the illustrated example, each of the first and the second terminal computer states is representative of one of first through third job states. The first job state is representative of "under-operation". The second job state is representative of "normal end". The third state is representative of "fault end".

Figure 4:
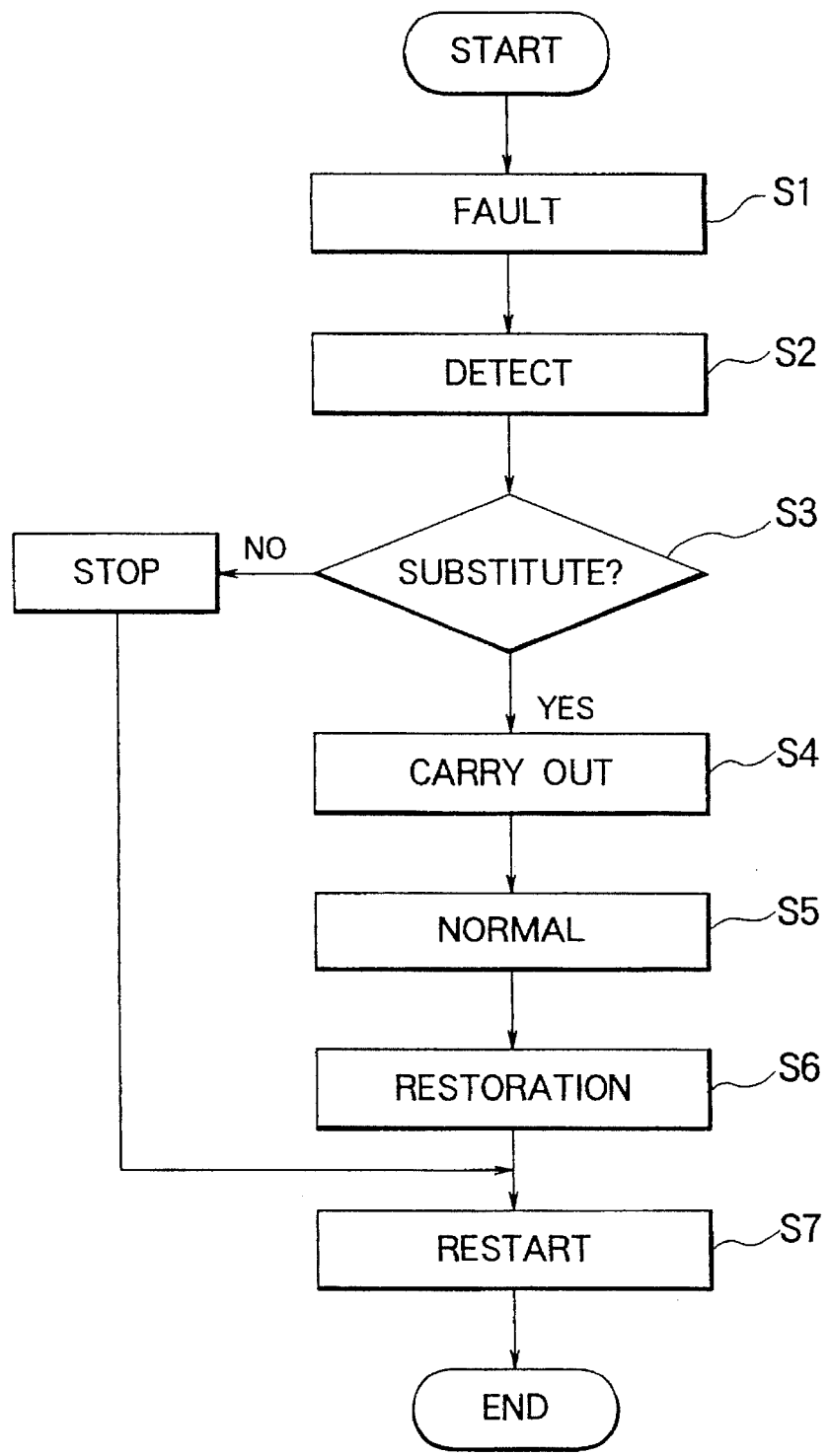
FIG. 4 is a flow chart for describing operation of the computer system illustrated in FIG. 1.

Referring to FIG. 4 in addition to FIG. 1, it will be assumed that a fault occurs in the first terminal computer 12-1. When the fault occurs in the first terminal computer 12-1 at a first step s1 labelled "FAULT", the first terminal computer state is changed to the third job state in the job state table 14. A monitoring circuit 23 always monitors the job state table 14. When the first terminal computer state is changed to the third job state, the monitoring circuit 23 detects the fault of the first terminal computer 12-1 at a second step s2 labelled "DETECT" and supplies the supplying circuit 20 with a first fault signal which is representative of fault of the first terminal computer 12-1. Supplied with the first fault signal, the supplying circuit 20 judges that the fault occurs in the first terminal computer 12-1 and judges that the second terminal computer 12-2 substitutes for the first terminal computer 12-1 in accordance with the allotment information at a third step s3 labelled "SUBSTITUTE". The supplying circuit 20 supplies the second control circuit 22 with a command signal having the name of the first terminal computer 12-1.

Supplied with the command signal, the second control circuit 22 reads the hardware resource data and software environment data out of the second buffer memory 18. The second control circuit 22 rewrites the allotment information into a renewal allotment information to store the renewal allotment information in the second buffer 18. In the renewal allotment information, the name of the operating on-line transaction system is rewritten into the name of the second terminal computer 12-2 in the first job G1. The name of the substitute on-line transaction system is rewritten into the name of the first terminal computer 12-1 in the first job G1. On the other hand, the first control circuit 21 rewrites the allotment information into the renewal allotment information to store the renewal allotment information in the first buffer memory 16 when the fault occurs in the first terminal computer 12-1.

The second terminal computer 12-2 starts to carry out the first job with reference to the hardware resource data and software environment data at a fourth step s4 labelled "CARRY OUT". The second terminal computer 12-2 carries out both of the first and the second jobs under control of the second control circuit 22.

When the first terminal computer 12-1 is restored to a normal state at a fifth step s5 labelled "NORMAL", a restoration command is supplied from a console section 23 to a restoration circuit 24. Responsive to the restoration command, the restoration circuit 24 supplies an operating command to the first control circuit 21 through the supplying circuit 20 at a sixth step s6 labelled "RESTORATION". The restoration circuit 24 further supplies a stop command to the second control circuit 22 through the supplying circuit 20.

Supplied with the operating command, the first control circuit 21 reads the hardware resource data and the software environment data out of the first buffer memory 17. The first control circuit 21 rewrites the renewal allotment information into the allotment information to store in the first buffer memory 16. The first terminal computer 12-1 restarts to carry out the first job in accordance with the hardware resource data and the software environment data at a seventh step s7 labelled "RESTART".

Supplied with the stop command, the second control circuit 22 stops carrying out only the first job. The second control circuit 22 rewrites the renewal allotment information into the allotment information to store in the second buffer memory 18. As a result, the second terminal computer 12-2 carries out only the second job.

By the way, if the allotment information is not stored in both of the first and the second buffer memories 16 and 18, the first terminal computer 12-1 is put out of operation at an eighth step s8 labelled "STOP". As a result, the process of the first job is stopped until the first terminal computer 12-1 is restored to the normal state.

When the fault occurs in the second terminal computer 12-2, the first terminal computer 12-1 continues to carry out the second job in a manner similar to the above-mentioned manner.

Only referring to FIG. 1, it is possible to substitute the second terminal computer 12-2 for the first terminal computer 12-1 when the first and the second terminal computers 12-1 and 12-2 normally put into operation. In this case, a first command is supplied from the console section 23 to a changing circuit 25. Responsive to the change command, the changing circuit 25 supplies the command signal to the second control circuit 22 through the supplying circuit 20. The changing circuit 25 further supplies the stop signal to the first control circuit 21. In a similar manner described above, the second terminal computer 12-2 starts to carry out the first job with reference to the hardware resource data and software environment data. Responsive to the stop command, the first terminal computer 12-1 stops carrying out the first job.

Although the positive integer N is equal to two in the above description, a specific one of the first through the N-th terminal computers puts into operation to process a job carried out at the faulty one of the terminal computers when the positive integer N is greater than two.

What is claimed is:

1. A computer system comprising a host computer and first through N-th terminal computers connected to said host computer, where N represents a positive integer which is greater than one, said first through said N- th terminal computers carrying out first through N-th jobs different from one another, said host computer comprising:

monitoring means for monitoring said first through said N-th terminal computers to judge whether or not a fault occurs in each of said first through said N-th terminal computers, said monitoring means producing a fault signal when said fault occurs in a faulty one of said first through said N-th terminal computers;

first producing means responsive to said fault signal for producing a command signal to a specific one of said first through said N-th terminal computers that is different from said faulty one of said first through said N-th terminal computers, said specific terminal computer being predetermined in each of said first through said N-th terminal computers; and second producing means for producing an operating command signal and a stop command signal in accordance with a restoration command to supply said operating command signal and said stop command signal to a restored terminal computer and said specific terminal computer, respectively;

said computer system further comprising console means connected to said host computer for supplying said second producing means with said restoration command when said faulty one of said first through said N-th terminal computers is restored to a normal state to be said restored terminal computer;

each of said first through said N-th terminal computers comprising:

control means responsive to said command signal, for controlling, on the basis of allotment information, a process of the job which is carried out at said faulty one of the first through the N-th terminal computers when said terminal computer is supplied with said command signal, said allotment information indicating said specific terminal computer in each of said first through said N-th terminal computers in correspondence to each of said first through said N-th jobs; said control means being responsive to said operating command signal, for restarting the job which is carried out at said restored terminal computer; said control means being responsive to said stop command signal, for stopping the control of the process of the job which is carried out at the faulty one of said first through said N-th terminal computers.

2. A computer system as claimed in claim 1, wherein said monitoring means comprises:

a job state table for memorizing states of said first through said N-th terminal computers as first through N-th terminal computer states, respectively; and detecting means for detecting whether or not said fault occurs in each of said first through said N-th terminal computers in accordance with said first through said N-th terminal computer states, said detecting means producing said fault signal when said fault occurs in a faulty one of said first through said N-th terminal computers.

3. A computer system as claimed in claim 2, wherein:

each of said first through said N-th terminal computer states is representative of one of first through third job states, said first job state being representative of an under-operation of said first through said N-th jobs, said second job state being representative of a normal end of said first through said N-th jobs, said third job state being representative of a faulty end of said first through said N-th jobs; and said detecting means producing said fault signal when said third job state is memorized as one of said first through said N-th terminal computer states in said job state table.

4. A computer system as claimed in claim 1, wherein each of said first through said N-th terminal computers further comprises:

buffer memory means for memorizing a hardware resource data and a software environment data, said hardware resource data being for defining hardware resources carrying out said first through said N-th jobs, said software environment data being parameters which define environment of said first through said N-th terminal computers; and said control means being operable on the basis of said hardware resource data and said software environment data.

5. A computer system as claimed in claim 4, wherein:

said host computer comprises supplying means for supplying said allotment information to each of said first through said N-th terminal computers on putting the host computer into operation; and each of said control means receives said allotment information and stores said allotment information in said buffer memory means.

6. A computer system as claimed in claim 1, wherein said host computer further comprises substituting means for substituting a particular one of said first through said N-th terminal computers for a selected one of said first through said N-th terminal computers to process said one of said first through said N-th jobs in addition to an own job assigned to said particular one of the first through the N-th terminal computers.

* * * * *